(12) United States Patent
Bultitude et al.

(10) Patent No.: US 9,490,072 B2
(45) Date of Patent: Nov. 8, 2016

(54) METHOD OF MAKING A HIGH CAPACITANCE MULTILAYER CAPACITOR WITH HIGH VOLTAGE CAPABILITY

(71) Applicant: Kemet Electronics Corporation, Simpsonville, SC (US)

(72) Inventors: John Bultitude, Simpsonville, SC (US); James R. Magee, Simpsonville, SC (US); Lonnie G. Jones, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 275 days.

(21) Appl. No.: 14/266,364

(22) Filed: Apr. 30, 2014

(65) Prior Publication Data

US 2014/0230210 A1 Aug. 21, 2014

Related U.S. Application Data

(62) Division of application No. 12/828,434, filed on Jul. 1, 2010, now Pat. No. 8,885,319.

(51) Int. Cl.
*H01G 4/30* (2006.01)
*H01G 4/005* (2006.01)
*H01G 4/232* (2006.01)

(52) U.S. Cl.
CPC ............... *H01G 4/30* (2013.01); *H01G 4/005* (2013.01); *H01G 4/232* (2013.01); *Y10T 29/435* (2015.01)

(58) Field of Classification Search
CPC ........ H05K 3/328; H01G 4/30; H01G 4/232; H01G 4/385
See application file for complete search history.

(56) References Cited

U.S. PATENT DOCUMENTS

| | | | |
|---|---|---|---|
| 4,097,911 A | 6/1978 | Dorrian | |
| 4,241,378 A | 12/1980 | Dorrian | |
| 5,144,527 A | 9/1992 | Amano et al. | |
| 5,295,289 A * | 3/1994 | Inagaki | H01G 4/232 29/25.42 |
| 5,493,769 A * | 2/1996 | Sakai | H01C 1/14 257/E23.061 |
| 5,692,280 A * | 12/1997 | Taniguchi | H01G 4/30 29/25.42 |
| 6,104,599 A | 8/2000 | Ahiko et al. | |
| 6,134,098 A | 10/2000 | Kuroda et al. | |
| 6,292,353 B1 | 9/2001 | Haratani et al. | |

(Continued)

FOREIGN PATENT DOCUMENTS

| | | |
|---|---|---|
| EP | 0866478 | 6/2005 |
| JP | 05135990 | 6/1993 |

(Continued)

OTHER PUBLICATIONS

European Patent Application No. 10794758.2; Supplementary European Search Report dated Jan. 2, 2013.

(Continued)

*Primary Examiner* — Minh Trinh
(74) *Attorney, Agent, or Firm* — Joseph T. Guy; Perkins Law Firm LLC (57) ABSTRACT

A method for making multilayer ceramic capacitors is described with high voltage capability without the need of coating the part to resist surface arc-over. One design combines a high overlap area for higher capacitance whilst retaining a high voltage capability. A variation of this design has increased voltage capability over this design as well as another described in the prior art although overlap area and subsequently capacitance is lowered in this case.

12 Claims, 10 Drawing Sheets

(56) References Cited

U.S. PATENT DOCUMENTS

| | | |
|---|---|---|
| 6,292,535 B1 | 9/2001 | Williams et al. |
| 6,563,689 B2 | 5/2003 | Yamamoto |
| 6,627,529 B2 | 9/2003 | Ireland |
| 6,683,782 B2 | 1/2004 | Duva |
| 6,829,134 B2 | 12/2004 | Yamauchi et al. |
| 6,898,069 B2 | 5/2005 | Yamaguchi et al. |
| 7,027,288 B2 | 4/2006 | Shimizu et al. |
| 7,336,475 B2 | 2/2008 | Bultitude et al. |
| 7,495,885 B2 | 2/2009 | Togashi et al. |
| 7,715,171 B2 | 5/2010 | Nakano et al. |
| 7,859,821 B2 | 12/2010 | Shimizu |
| 8,102,639 B2 * | 1/2012 | Kasuya ............... H01G 4/005 29/25.42 |
| 8,120,891 B2 | 2/2012 | Takashima et al. |
| 8,885,319 B2 * | 11/2014 | Bultitude ............ H01G 4/005 361/303 |
| 2006/0213603 A1 | 9/2006 | Lee et al. |
| 2006/0215349 A1 | 9/2006 | Lee et al. |
| 2008/0165468 A1 | 7/2008 | Berolini et al. |
| 2009/0052111 A1 | 2/2009 | Bultitude et al. |
| 2009/0052122 A1 | 2/2009 | Johnson et al. |
| 2010/0039749 A1 | 2/2010 | Ritter et al. |
| 2010/0091429 A1 | 4/2010 | Koga et al. |

FOREIGN PATENT DOCUMENTS

| | | |
|---|---|---|
| JP | 06069063 | 3/1994 |
| JP | 8181033 | 7/1996 |
| JP | 09190946 | 7/1997 |
| JP | 09270360 | 10/1997 |
| JP | 2000106321 | 4/2000 |
| JP | 2001015373 | 1/2001 |
| JP | 2002299148 | 10/2002 |
| JP | 2005216955 | 8/2005 |
| JP | 20060666831 | 3/2006 |
| JP | 2006128283 | 5/2006 |
| JP | 2006190774 | 7/2006 |
| JP | 2007299984 | 11/2007 |
| WO | WO 2009/001842 | 12/2009 |

OTHER PUBLICATIONS

International Search Report and Written Opinion of the International Searching Authority; PCT/US2010/040754, Sang Min Lee; Feb. 25, 2011.

* cited by examiner

METHOD OF MAKING A HIGH CAPACITANCE MULTILAYER CAPACITOR WITH HIGH VOLTAGE CAPABILITY

CROSS-REFERENCE TO RELATED APPLICATIONS

The present application is a divisional application of pending U.S. patent application Ser. No. 12/828,434 filed Jul. 2, 2010, which claims priority to expired U.S. Provisional Application No. 61/222,296 filed Jun. 1, 2009.

BACKGROUND OF INVENTION

The present invention is related to a capacitor exhibiting high capacitance per unit volume. More specifically, the present invention is related to an improved conductive inner electrode design which improves electrode overlap, and therefore capacitance, with high voltage rating and no arc-over.

Traditional high voltage capacitor designs, such as for use at ≥500Vdc, typically combine 2 or more capacitors in series within the same multilayer ceramic device package. These serial designs are effective at increasing effective voltage since the effective voltage is divided between the 2 capacitors. Capacitors arranged in series are also effective in decreasing the occurrence of surface-arc-over. Unfortunately, the effective capacitance, $C_{eff}$, of a serial device is significantly lowered since $1/C_{eff} = \Sigma 1/C_n$ where n is the number of capacitors in series.

The practitioner has therefore had to balance the desire for high voltage capability, which can be improved by serial capacitors, with the desire for high capacitance, which is compromised with serial capacitors.

For voltages up to about 2,500 Vdc the capacitance can be increased with minimal flash over by coating the capacitors themselves, or the board or assembled device, using standard MLCC designs. In the case of the individual monolithic multilayer capacitors the leads are attached and the part epoxy coated. A significant disadvantage to this approach is that the leaded part cannot typically be used in an automated surface mount assembly process and there is some additional cost associated with the leads and epoxy.

One approach to mitigate the problem associated with flashover is described in U.S. Pat. No. 6,134,098 wherein lower K dielectric layers are used on the top and bottom of a series capacitor design. Although this approach is effective to decrease flash over this is still a serial capacitor design and the effective capacitance is lower as detailed above. Furthermore, differences in the thermal expansion coefficient of the various materials are problematic since thermal stresses are created during tiring.

Japanese Patent Abstract 2006-066831 by SHIMIZU MICHINAO, ITO KAZUNORI and KOMATSU TOSHIAKI discloses a multilayer ceramic capacitor design which raises the starting voltage of the surface discharge. To achieve this effect a serial type arrangement of capacitors, using multiple internal electrode prints, is required.

Coating of parts whilst retaining the ability to surface mount can retard arc over. U.S. Pat. No. 6,627,529, by Duva and related U.S. Pat. No. 6,683,782, both of which are incorporated herein by reference, describe the benefits, and method, for applying para-xylylene polymer coatings to multi-layer ceramic capacitors. Coating individual parts, or the final assemblies, is cost prohibitive so these approaches have been restricted to high value added applications in electronics.

Capacitance, C, is defined by the following equation; $C = \in_r \in_0 An/t$; where $\in_r$ is the relative permittivity of the dielectric; $\in_0$ is a constant equal to the permittivity of free space; A is the overlap area for each internal conductive layer, also referred to as an active; n is the number of actives and t is the separation distance or thickness between the electrodes. Therefore, it is an ongoing desire to increase the number of layers and overlap area while decreasing the layer separation. Often the efforts to increase voltage are contrary to one, or more of these desires.

For example, in a more recent approach presented in U.S. Pat. No. 7,336,475 by Bultitude et al, which is incorporated herein by reference, shield electrodes are used which allow for a high voltage capability by prohibiting surface-arc-over whilst retaining a relatively high overlap area for high capacitance in a non-serial design. This design combines a top and bottom shield electrode that protects the oppositely charged electrode below from arc-over from the terminal in contact with the shield. Side shields are also described which function in a similar manner by protecting each active electrode along the side of the part by connecting to the terminal of opposite polarity while overlapping the active electrode to prevent arc over.

US Pat. Publ. No. 2009/0052111 also to Bultitude, the entirety of which is incorporated by reference, describes the use of a coating of polyimide applied by spin coating to further increase voltage breakdown. Related US Pat. Publ. No. 2009/0052112, the entirety of which is incorporated by reference, describes the need to shield between the terminal and the opposed electrode. In both cases the MLCC designs described use side shields connected to the opposed terminal.

The presence of side shields connected to the opposite terminal in each of the active layers confers a risk of a breakdown pathway between the shields and the active electrode. This pathway may occur due to contamination or electrode "bleed out" during the electrode printing process that would result in a short circuit and catastrophic failure of the capacitor. Furthermore, although the prior art designs have more overlap, and therefore higher capacitance, than the serial designs the side shields take-up a significant area which does not contribute to capacitance. The area occupied by the side shields decreases the available capacitance as a function of total volume since the area occupied by the shields can not be utilized for electrode overlap.

In spite of the advances in the art there is still a long standing desire for a capacitor with improved capacitance, for use in high voltage applications, which has minimal flashover. Such a capacitor is provided herein.

SUMMARY OF THE INVENTION

It is an object of this invention to provide a capacitor with reduced flashover, also called surface-arc-over, without the need for another type of dielectric with potential thermal mismatch issues between different dielectrics whilst maintaining a high capacitance.

It is another object of the invention to provide a capacitor with improved capacitance, per unit volume, without loss of effective voltage rating and with decreased flashover.

These and other inventions, as will be realized an improved capacitor. The capacitor has first internal conductors and second internal conductors in an alternating layer wherein the first internal conductor has a first polarity and the second internal conductor has opposing polarity. A first external termination is in electrical contact with the first internal conductors wherein the first external termination has a first side extension which extends a distance along a side of the capacitor which is perpendicular to the first internal conductors and the second internal conductors. A second external termination is in electrical contact with the second internal conductors wherein the second external termination has a second side extension which extends a second distance along a second side of the capacitor which is perpendicular to the first internal conductors and the second internal conductors. The first internal conductors extend towards the second external termination to a separation distance from the second external termination which is less than the second distance. The first internal conductors comprise a bulk region and a secondary region wherein the secondary region has a region width which is less than a bulk width of the bulk region.

Yet another embodiment is provided in an improved capacitor. The capacitor has first internal conductors and second internal conductors in an alternating layer wherein the first internal conductor has a first polarity and the second internal conductor has opposing polarity. A first external termination is in electrical contact with the first internal conductors wherein the first external termination has a first side extension which extends a distance along a side of the capacitor which is perpendicular to the first internal conductors and the second internal conductors. A second external termination is in electrical contact with the second internal conductors wherein the second external termination has a second side extension which extends a second distance along a second side of the capacitor which is perpendicular to the first internal conductors and the second internal conductors. The first internal conductors extend towards the second external termination to a separation distance from the second external termination which is less than the second distance. The first internal conductors comprise a bulk region and a secondary region wherein the secondary region is further from the second side extension than the second distance.

Yet another embodiment is provided in a method of forming an multilayered ceramic capacitor. The method includes the steps of:

printing a pattern of print regions of conductive material on a series of sheets wherein each print region has a bulk region and a secondary region wherein the secondary region has a region width which is less than a bulk width of the bulk region; forming a layered assembly by the steps of:

overlaying a first sheet over a bottom sheet in parallel offset fashion wherein at least one print region of the bottom sheet is overlapped but laterally offset from a print region of the first sheet with a dielectric precursor between the overlapped but laterally offset print regions;

overlaying a second sheet over the first sheet wherein at least one print region of the second sheet is overlapped but offset from the print region of the first sheet and the print region of the bottom sheet with a dielectric between the overlapped but laterally offset print regions;

overlaying additional sheets with alternating sheets having the print region aligned with the first sheet and the second sheet respectively with a dielectric between the overlapped but laterally offset print regions, overlaying a top sheet with the print region aligned with the bottom sheet with a dielectric between the overlapped but laterally offset print regions;

compacting and dicing the overlayed sheets to isolate a layered structure with print regions of the first layer forming first internal conductors; print regions of the second layer forming second internal conductors and print regions of the top sheet and the bottom sheet forming shield layers;

firing the compacted and diced overlayed sheets to remove organic materials and fuse the overlayed sheets into a fired monolith;

forming a first external termination in electrical contact with the first internal conductors; and forming a second external termination in electrical contact with the second internal conductors.

DETAILED DESCRIPTION

The present invention is directed to an improved capacitor. More specifically, the present invention is directed to a capacitor with improved geometry of inner conductive layers.

The invention will be described with reference to the various figures which are an integral non-limiting component of the disclosure. Throughout the figures similar elements will be numbered accordingly. For simplicity, a minimal number of active layers is illustrated with the understanding that the actual number used may be quite large.

Figure 1:
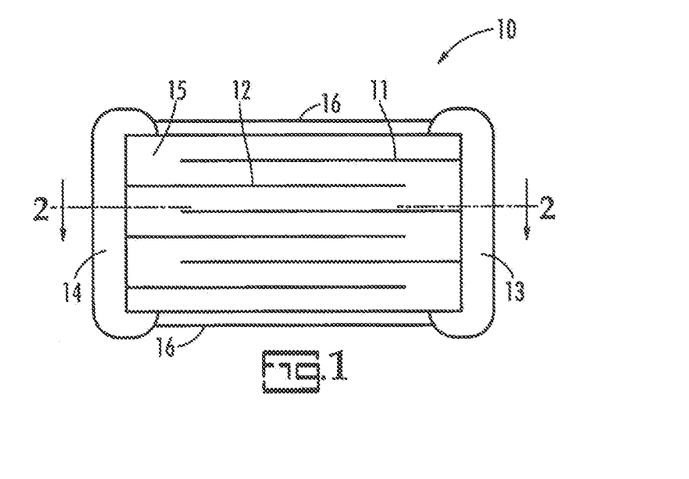
FIG. 1 is a schematic cross-sectional view of a capacitor.

A cross-sectional schematic view of a multi-layer ceramic capacitor of the present invention is illustrated schematically in FIG. 1. In FIG. 1, the capacitor, generally represented at 10, comprises a multiplicity of conductive inner electrodes, 11 and 12, of alternating polarity with dielectric ceramic layers, 15, dispersed there between. The alternating conductive inner electrodes terminate at opposing external terminals, 13 and 14. An insulating layer, 16, may be applied.

Figure 2:
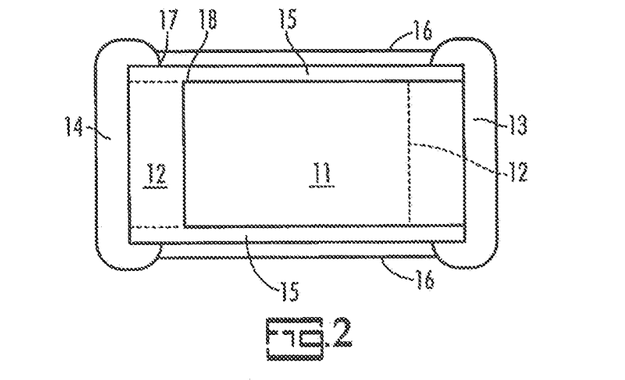
FIG. 2 is a schematic cross-sectional view of a capacitor taken along line 2-2 of FIG. 1.

A cross-sectional schematic view of the capacitor of FIG. 1 taken along line 2-2 is provided in FIG. 2. In FIG. 2, an arc point exist as the closest point between the side extension, 17, of the external termination, 14, and the closest extent, 18, of the conductive inner electrode, 11, of opposing polarity.

Figure 3:
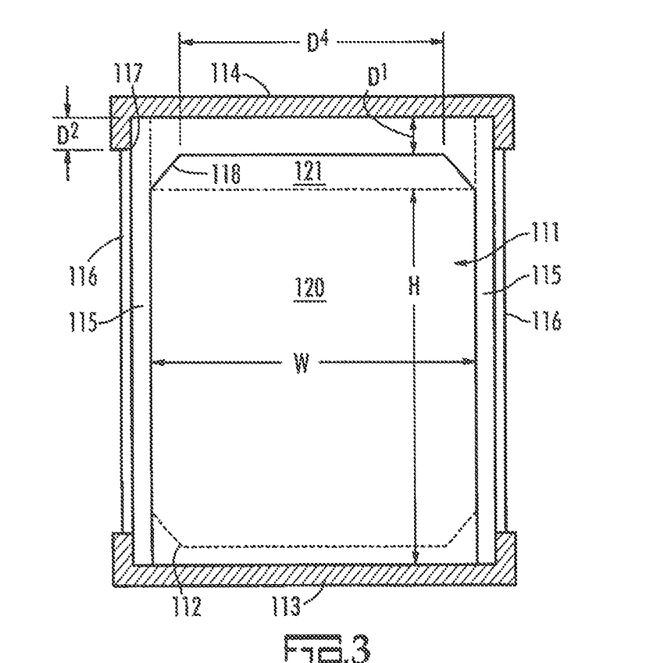
FIG. 3 is a schematic cross-sectional view of a capacitor.

An embodiment of the invention is illustrated in cross-sectional schematic view taken parallel to the inner electrodes in FIG. 3. In FIG. 3, a first conductive inner electrode, 111, is in electrical contact with an external termination of common polarity, 113. A second conductive electrode, 112, is also in electrical contact with an external termination of common polarity, 114, with the first and second conductive inner electrodes being of opposing polarity as would be realized. Dielectric, 115, is between and around the conductive electrodes. An insulating layer, 116, may be applied.

For the purposes of discussion the first conductive inner electrode and second conductive inner electrode are of the same shape and size. Different shapes and sizes are functional yet for manufacturing purposes it is highly desirable that they be the same since each is designed to be as large as possible within the constraints of avoiding flashover as will be more fully described. In the discussion, conductive inner electrode will refer to one layer or both layers.

The inner conductive layer is defined as having a bulk zone, 120, which is most preferably rectangular, and a secondary zone, 121. The bulk zone and secondary zone are defined for the purposes of geometry and taken together they form a seamless inner conductive layer preferably with no difference in layer thickness or composition. At least a portion of the secondary zone is a distance, $D^1$, from the external termination of opposing polarity and a distance, $D^2$, is the distance the external termination side extension, 117, extends along the side away from the external termination to avoid a close point of approach between 118 and 117.

The bulk zone, 120, preferably is as large as possible to provide the most overlap with the inner conductive layer of opposing polarity. The secondary zone, 121, comprises a region which has a width which is narrower than the width, W, of the bulk zone. The narrowed region of the secondary zone insures that the closest distance between the external termination side extension, 117, and the narrowed portion, 118, of the secondary zone is at least as large as the closest separation distance between the conductive inner electrode and external termination of opposing polarity, represented as D1. The height of the bulk zone, H, is preferably at least 66% of the longest length of the inner conductive layer measured from the contact point with the exterior termination of common polarity. A height of the bulk zone of as low as 25% has been demonstrated successfully.

Representative conductive inner electrodes are illustrated schematically in FIGS. 4A-4F wherein each conductive inner electrode, 111, is illustrated with a rectangular bulk zone, 120, and a secondary zone, 121.

Figure 4A:
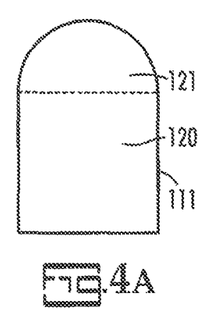
FIGS. 4A-4F are schematic representations of conductive inner electrodes.

In FIG. 4A, the secondary zone comprises a semiround shape. The semiround shape can have the same radius over the entire zone thereby forming a semicircle. Alternatively, the radius can vary thereby forming a semi-oval shape or a semi-obround shape wherein an obround shape consist of two semicircles connected by parallel lines tangent to their endpoints.

Figure 4B:
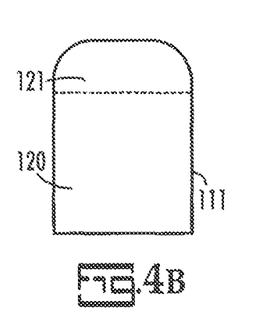

In FIG. 4B the secondary zone comprises a partially rounded rectangular shape. The rounded portions may have the same radius over the entire round zone thereby forming a semicircle or the radius can vary thereby forming a semi-oval shape or a semi-obround shape.

Figure 4C:
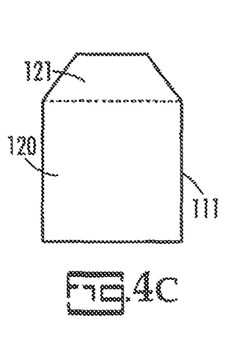

In FIG. 4C the secondary zone is trapezoidal with the shorter parallel face preferably opposite to the bulk zone.

Figure 4D:
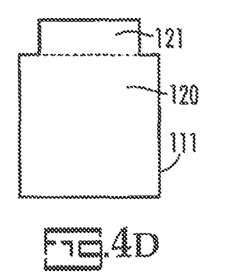

In FIG. 4D the secondary zone is rectangular with a length, L, which is less than the width, W, of the bulk zone.

Figure 4E:
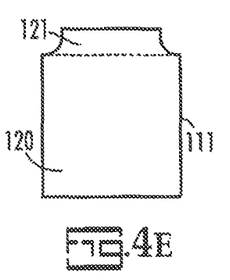

In FIG. 4E the secondary zone is a concave trapezoid wherein the non-parallel sides of a trapezoid are concave. The concave shape is preferably rounded and may have the same radius over the entire round zone thereby forming a semicircle or the radius can vary thereby forming a semi-oval shape or a semi-obround shape as described relative to FIG. 4A.

Figure 4F:
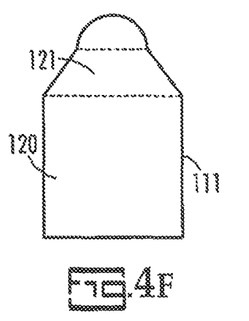

In FIG. 4F the secondary zone is a combination with a first secondary zone being trapezoidal and the second secondary zone being semiround.

In the secondary zone the radius of any rounded portion is sufficiently large that the separation between the closest extent of the external termination side extension and the inner conductive electrode is larger than the separation between the secondary portion and the external termination of opposing polarity.

The dielectric ceramic layers preferably comprise a dielectric ceramic composition. The major constituent material for the ceramic, for example, may be made of $BaTiO_3$, $BaCaTiZrO_3$, $BaCaZrO_3$, $BaZrO_3$, $CaZrO_3$ and/or $CaTiO_3$ but the current invention is not particularly limiting to the type of ceramic dielectric material used and other dielectric materials, insulators, magnetic materials and semiconductor materials, or combinations thereof, as known in the art. The dielectric ceramic composition can be used in conjunction with precious metal or base metal inner electrodes. Cheaper base metal electrodes are most preferred and they require a non-reducible ceramic which can be sintered in a reducing atmosphere below the melting temperature of common base metals, such as nickel, without detriment to the electrode thereby yielding a capacitor with high electrode continuity and excellent electrical properties.

The conductive inner electrodes comprise precious metal or base metal. Common base metals include nickel, tungsten, molybdenum, aluminum, chromium, copper or an alloy thereof which can be fired in a reducing atmosphere. Common precious metals are silver, palladium, platinum, gold or alloys thereof. Most preferably the base metal is nickel.

The composition of the external terminations and side extensions is not particularly limiting herein and any composition typically employed in the art is sufficient. Silver, palladium, copper, nickel or alloys of these metals compatible with the inner electrodes blended with various glass frits are particularly relevant. A plating layer or multiple plating layers can be formed on the external end terminations.

Because of the use of base metals in the conductive inner electrodes, the capacitor of the present invention is preferably fired in a reducing atmosphere. The reducing overall atmosphere average $PO_2$ is preferably between $10^{-3}$ to $10^{-18}$ atm, while the $PO_2$ in localized regions within the capacitor monolith have been estimated to be as low as $\sim 10^{-28}$ atm (C. A. Randall, et al., "A Structure-Property-Processing Approach Targeted to the Challenges in Capacitive Ceramic Devices," CARTS USA 2006 PROCEEDINGS, at 3-12, Apr. 3-6, 2006).

An advantage of the present invention is the ability to use the same materials commonly employed and the conventional tape casting process familiar to those skilled in the art. In this process the ceramic powder, such as the preferred base metal compatible X7R dielectric comprising a substantial portion of barium titanate, is dispersed in an organic medium then cast into a tape.

Some of the tape is printed with the electrode pattern, in this case a paste of nickel in organic medium.

Merely as an example of the manufacturing process of the present invention, a ceramic slurry is prepared by blending and milling the ceramic compounds of choice with a dispersant in either water or an organic solvent such as, for example, ethanol, isopropanol, toluene, ethyl acetate, propyl acetate, butyl acetate or a blend thereof. After milling a ceramic slip is prepared for tape-casting by adding a binder and a plasticizer to control rheology.

The slip is then processed into a thin sheet by tape-casting. After drying the sheet, a multiplicity of electrodes are patterned on the sheet by using, for example, a screen-printing method to form a printed ceramic sheet.

A laminate green body is prepared by stacking onto a substance such as polycarbonate, polyester or a similar method: 1) a certain number of unprinted ceramic sheets representing the bottom covers, then 2) a certain number of printed ceramic sheets in alternate directions so as to create alternating electrodes that terminate at opposing ends, and 3) a certain number of unprinted ceramic sheets representing the top covers. Variations in the stacking order of the printed and unprinted sheets can be used with the dielectric material of this invention. The stack is then pressed at between 20° C. and 120° C. to promote adhesion of all laminated layers. The laminated green body is then cut into individual green chips.

Capacitors made with precious metal inner electrodes can be sintered in air up to temperatures not exceeding 1400° C. In the case of base metals the ceramic is then sintered in a reductive atmosphere with a partial oxygen partial pressure of $10^{-3}$ to $10^{-18}$ atm at a temperature not to exceed approximately 1500° C.

The sintered capacitor is preferably subjected to end surface grinding by barrel or sand blast, as known in the art, followed by applying external electrode paste to form the terminations to the inner electrode. A further firing is then done to complete the formation of the termination. For precious metal electrodes this firing is typically done in air at temperatures of about 500° C. to 900° C. For base metals this firing is typically done in nitrogen atmosphere at a temperature of about 600° C. to 1000° C. for about 0.1 to 1 hour.

Layers of nickel and tin may then be plated on the outer electrodes to enhance solderability and prevent oxidation of the outer electrodes.

A particularly preferred embodiment of the invention is illustrated in FIGS. 10A-10F wherein each electrode has a bulk region, 120, and a secondary region, 121, as illustrated in FIGS. 4A-F and described relative thereto. In FIGS. 10A-10F a tertiary region, 121', is provided which is preferably identical to the secondary zone in shape and size. The secondary zone and tertiary zone can be different in shape and size but this is highly undesirable due to increases in manufacturing complexity as will be better understood from the discussion which follows.

Figure 11:
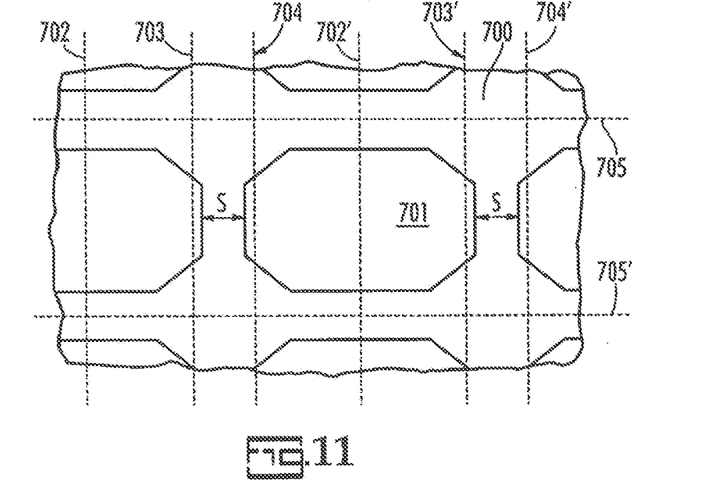
FIG. 11 is a schematic representation of an active electrode print.

The advantage of a symmetrical electrode, as described relative to FIGS. 10A-10F will be discussed with reference to FIG. 11. In FIG. 11 a conductive region is illustrated, for convenience, having a rectangular bulk region and symmetrically disposed trapezoid secondary and tertiary regions. A sheet, 700, is prepared with a multiplicity of identical print zones, 701, thereon. It is preferred that each print zone is separated a distance, S, from the adjacent print zone as measured between the narrowed ends. In practice, the distance S needs to be sufficiently large to avoid any shorting or arching between subsequent print regions. A separation of at least 0.20 mm (0.008 inches) is satisfactory. An advantage of this design is that the top and bottom shield electrodes and electrodes with both polarities can be made from a common print. This eliminates the necessity for multiple print patterns and greatly improves manufacturability. By way of example, the sheet can be cut along line, 702 and 702', wherein each half of the illustrated print zone will function as a shield electrode in the finished product as will be more clearly realized with reference to FIGS. 12-14 and discussion thereof. Similarly, the sheet can be cut along line, 703 and 703', which is intended to just separate the print zone, to form an active layer of a first polarity by being attached to an external termination at the cut line. Similarly, the sheet can be cut along line, 704 and 704', to form an active layer of a second polarity. Cut line 702 and 702' are preferably centered within the print zone whereas cut lines 703, 703'; 704 and 704' are preferably just inside of the print zone thereby insuring adequate contact with the eventual external termination. The layers are cut along lines 705 and 705' to isolate individual capacitive units.

Figure 12:
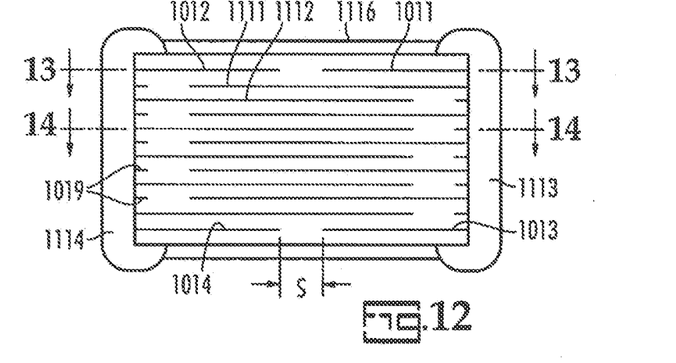
FIG. 12 is a schematic cross-sectional view of a capacitor.
Figure 13:
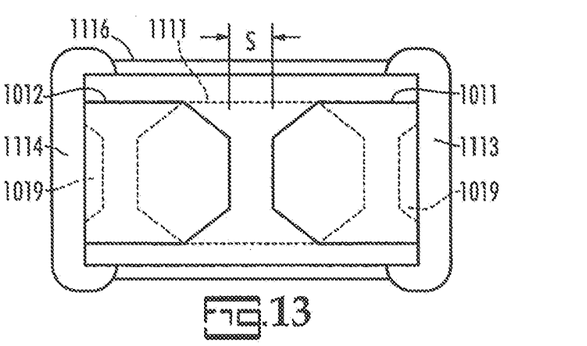
FIG. 13 is a schematic cross-sectional view of the capacitor of FIG. 11 taken along line 13-13.
Figure 14:
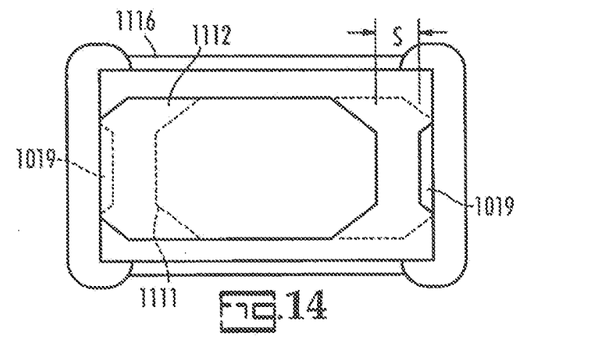
FIG. 14 is a schematic cross-sectional view of the capacitor of FIG. 11 taken along line 14-14.
Figure 15:
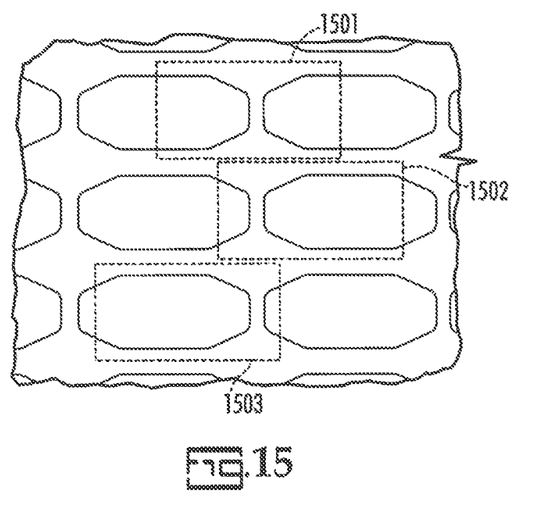
FIG. 15 is a schematic representation of an active electrode print and FIG. 16 is a schematic representation of an embodiment of the invention.
Figure 16:
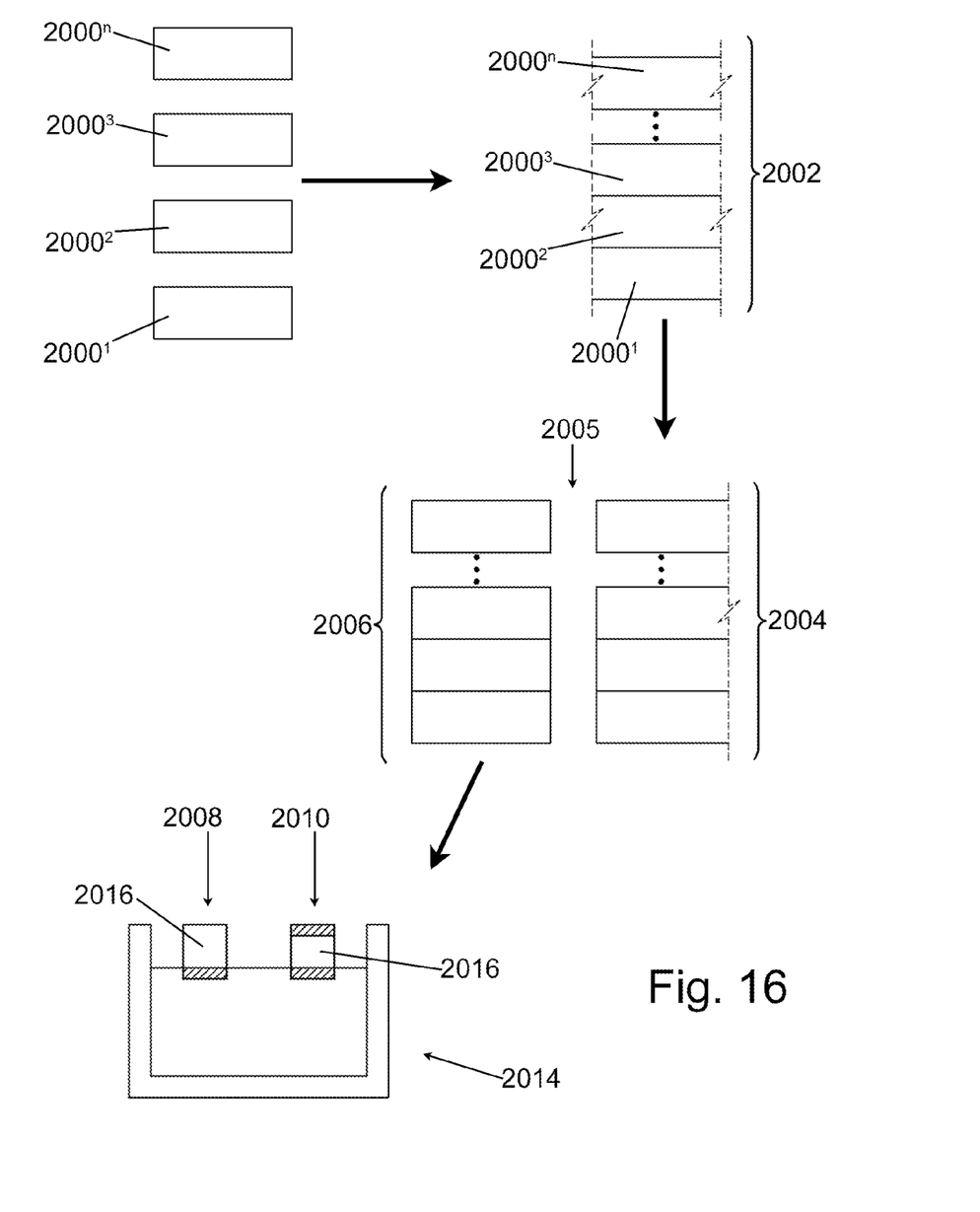

A capacitor formed utilizing the symmetrical electrode of FIG. 11 is illustrated in cross-sectional side view in FIG. 12. FIG. 13 is a cross-sectional view of the capacitor of FIG. 12 taken along line 13-13 and FIG. 14 is a cross-sectional view of the capacitor of FIG. 12 taken along line 14-14. In FIGS. 12-14, the active electrodes, 1111 and 1112, are of opposing polarity with alternate active electrodes in electrical contact with opposing external terminations, 1113 and 1114. Tabs, 1019, are remnants of the cut pattern as realized from the cut patterns illustrated in FIG. 15. The tabs are not particularly preferred but are an artifact of the cutting operation. The shield electrodes, 1011, 1012, 1013 and 1014, are disposed on each face, parallel to the active electrodes. Shield electrodes 1012 and 1013 are functional shields which. protect the adjacent active electrode from arcing to the external termination in closest proximity. Shield electrodes, 1011 and 1014, are optional electrodes provided for manufacturing convenience as understood in the art. The optional insulating layer, 1116, is as discussed above. The shield electrodes are separated by a distance, S, which corresponds to the separation of the print zones as described relative to FIG. 11. A method of forming a multilayered ceramic capacitor is illustrated schematically in FIG. 16. In. FIG. 16 a pattern of print regions of conductive material on a series of sheets, 2000, wherein each print region of said print regions comprises a bulk region and a secondary region, as illustrated in FIG. 15 and described related to FIG. 15. A layered assembly, 2002, is formed overlaying a first sheet, $2000^2$, over a bottom sheet, $2000^1$, in parallel offset fashion wherein at least one print region of the bottom sheet is overlapped but laterally offset from a print region of the first sheet, as illustrated in FIGS. 1-3 and 12-14, with a dielectric precursor between the overlapped but laterally offset print regions. Overlaying a second sheet, $2000^3$, the first sheet wherein at least one print region of the second sheet is overlapped but offset from the print region of the first sheet and the print region of the bottom sheet, as represented 1012, 1111 and 1112 of FIG. 12, with a dielectric between said overlapped but laterally offset print regions. Overlaying additional sheets with alternating sheets having the print region aligned with the first sheet and said second sheet respectively, as illustrated in FIG. 12, with a dielectric between said overlapped but laterally offset print regions. Overlaying a top sheet with the print region. aligned with the bottom sheet with a dielectric between the overlapped but laterally offset print regions thereby forming un-fired, compacted sheets, 2002, in a layered assembly; dicing, 2005, the un-fired, compacted sheets to isolate a layered structure, 2004 and 2006, with print regions of the first layer forming first internal conductors wherein the print regions of the second layer forming second internal conductors and print regions of the top sheet and the bottom sheet form shield layers.

Firing the layered assembly to remove organic materials and fusing the sheets to form a fired monolith, 2016. Forming a first external termination in electrical contact with the first internal conductors, at 2008, on the fired monolith. Forming a second external termination. in electrical contact with the second internal conductors on the fired monolith, at 2010.

As would be realized from the discussion relative to FIGS. 11-14 the symmetrical electrode pattern allows for a single pattern to be used for shield electrodes, and both actives, by merely shifting adjacent sheets in a parallel arrangement. This greatly simplifies sheet placement during capacitor manufacture and any sheet can function for any layer within the capacitor thereby minimizing the number of different parts which must be manufactured.

EXAMPLES

The following examples use tapes made of the same material and with the same fired thickness of 0.001" (25.4 μm). All of the parts utilized a 1206 case size manufactured with the same materials by the same process the only factor affecting the electrical properties is the overlap area A which is a function of the design of the internal conductive electrode. No coatings were applied to these capacitors. Conductor designs are described in more detail in Table 1 and in the examples.

TABLE 1

| Example | Total Number of Electrode Prints | Active or Intermediate Active Electrode Prints | Top & Bottom Shield Electrode Prints |
|---|---|---|---|
| 1 | 40 | 40 | 0 |
| 2 | 42 | 40 | 2 |
| 3 | 42 | 40 | 2 |
| 4 | 42 | 40 | 2 |
| 5 | 42 | 40 | 2 |
| 6 | 42 | 40 | 2 |
| 7 | 42 | 40 | 2 |
| 8 | 42 | 40 | 2 |

Comparative Example 1

Figure 5:
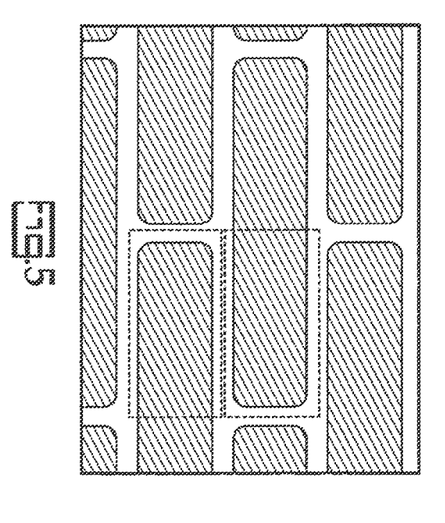
FIG. 5 is a schematic representation of an active electrode print.

A basic MLCC was manufactured using the active overlap pattern shown in FIG. 5 wherein for adjacent sheets the areas in the window overlap as would be realized by one of skill in the art.

Comparative Example 2

Figure 6:
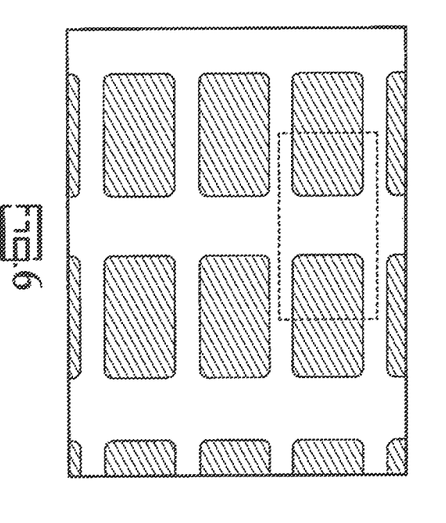
FIG. 6. is a schematic representation of an top and bottom shield electrode print.

A similar active design was used to the design described in Example 1 above accept that additional first and last prints were added with a top and bottom shield electrode pattern with the intermediate actives identical to those described in Example 1. This top and bottom shield electrode pattern is shown in FIG. 6 by overlaying the part area in the window with a window of the printed tape of FIG. 5.

Comparative Example 3

Figure 7:
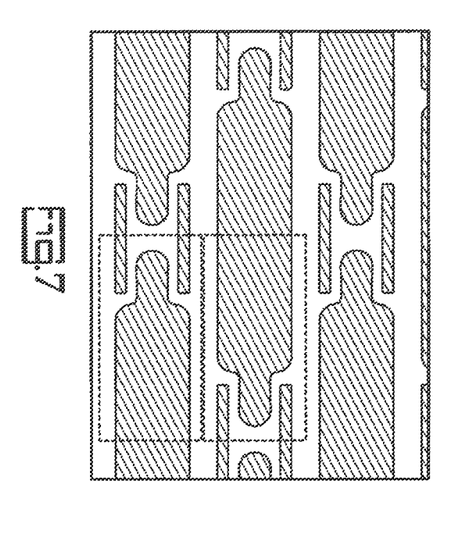
FIG. 7 is a schematic representation of an active electrode print.

In addition to using the top and bottom shields described in Example 2 the side shields were used in the intermediate actives as shown in FIG. 7 below. Furthermore, in order to maximize the available overlap area, and so achieve the highest possible capacitance, only 2 side shields are employed. It can also be seen that since the side shields are connected to the opposite terminal of the capacitor breakdown caused by a low insulation pathway between a side shield and active would result in a short circuit and catastrophic failure.

Inventive Examples 4-7

Figure 8:
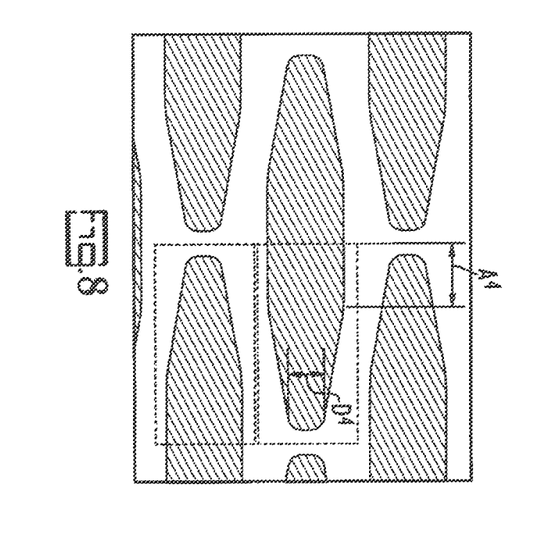
FIG. 8 is a schematic representation of an active electrode print.

Top and bottom shields as described in Examples 2 and 3 were used but there are no side shields in the active layers as described FIG. 7 above. The inventive internal conductors eliminate the requirement for side shields by using secondary zones of the electrode to increase the distance from the termination of opposite polarity and the end of the conductive inner layer. Although the tapering decreases the available overlap area compared to Examples 1 and 2 it still achieves a higher electrical breakdown than either of these examples whilst retaining a higher capacitance in all cases compared to Example 3. The dimensions, after firing, used in the inventive electrode designs of Examples 4, 5, 6 and 7 are summarized in Table 2 with reference to FIG. 8. In this way capacitance can be maximized whilst retaining a high voltage breakdown as noted in the electrical properties shown in Table 3.

TABLE 2

| Example | $A^4$ (mm) | $A^4$ (inches) | $D^4$ (mm) | $D^4$ (inches) |
|---|---|---|---|---|
| 4 | 0.998 | 0.0393 | 0.500 | 0.0197 |
| 5 | 2.02 | 0.0795 | 0.500 | 0.0197 |
| 6 | 0.998 | 0.0393 | 0.813 | 0.0320 |
| 7 | 2.02 | 0.0795 | 0.813 | 0.0320 |

Inventive Example 8

Figure 9:
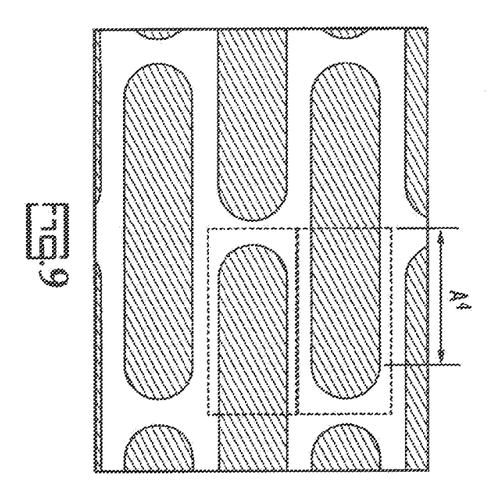
FIG. 9 is a schematic representation of an active electrode print.
Figure 10A:
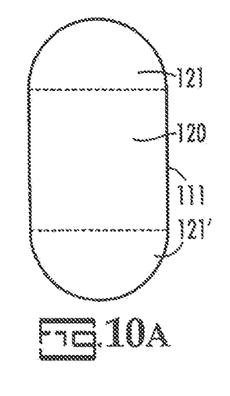
FIG. 10A-F are schematic representations of conductive inner electrodes.
Figure 10B:
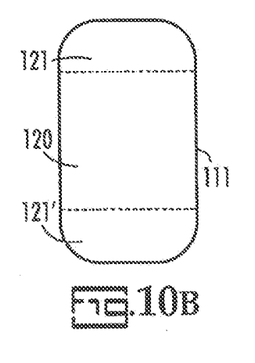
Figure 10C:
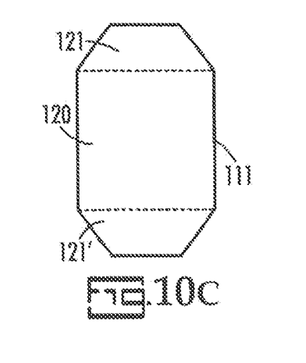
Figure 10D:
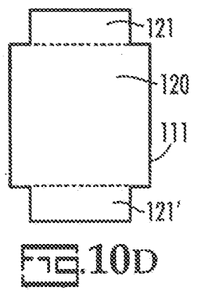
Figure 10E:
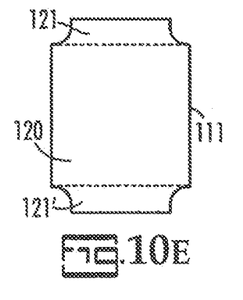
Figure 10F:
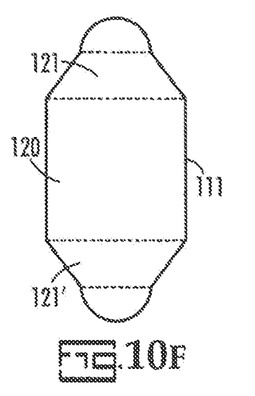

A semi-circle tapered design was used at the end of the electrode. In this case the maximum extent of the electrode ($A^4$) is 2.02 mm (0.0795 inches), after firing, which is the same as examples 5 and 7. The intermediate active prints are shown in FIG. 9.

The electrical properties of Examples 1-8 are summarized in Table 3.

TABLE 3

| | Capacitance and Dissipation Factor - 50 pcs | | | | | Voltage Breakdown | | | |
|---|---|---|---|---|---|---|---|---|---|
| | 48 hr Cap | Cap Std Dev | Cap % Std | 48 hr Df | Df Std Dev | In Air - 50 pcs (VDC) | | | |
| Example | Mean (nF) | (nF) | Dev | Mean (%) | (%) | Avg. | Max. | Min. | Std. Dev. |
| 1 | 137.48 | 0.86 | 0.63% | 1.42 | 0.039 | 972 | 1350 | 730 | 146 |
| 2 | 141.00 | 1.44 | 1.02% | 1.48 | 0.024 | 1347 | 1720 | 1060 | 156 |
| 3 | 81.01 | 0.74 | 0.91% | 1.47 | 0.015 | 1712 | 2140 | 1120 | 224 |
| 4 | 85.34 | 0.55 | 0.64% | 1.49 | 0.010 | 1504 | 2070 | 1150 | 203 |
| 5 | 98.21 | 0.86 | 0.88% | 1.35 | 0.029 | 1653 | 1860 | 1270 | 118 |

TABLE 3-continued

| | Capacitance and Dissipation Factor - 50 pcs | | | | | Voltage Breakdown In Air - 50 pcs (VDC) | | | |
|---|---|---|---|---|---|---|---|---|---|
| Example | 48 hr Cap Mean (nF) | Cap Std Dev (nF) | Cap % Std Dev | 48 hr Df Mean (%) | Df Std Dev (%) | Avg. | Max. | Min. | Std. Dev. |
| 6 | 98.09 | 1.44 | 1.47% | 1.41 | 0.028 | 1635 | 1860 | 1210 | 166 |
| 7 | 109.06 | 0.74 | 0.68% | 1.44 | 0.022 | 1635 | 1840 | 1350 | 138 |
| 8 | 107.37 | 0.63 | 0.58% | 1.46 | 0.027 | 1603 | 1830 | 1150 | 188 |

This electrical data shows the average capacitance of an MLCC made with the design described in Examples 4, 5, 6, 7 and 8 are higher than in comparative Example 3. Example 4 has a capacitance of 85.34 nF compared to 81.01 nF for the patented design in Example 3. Example 4 has 5.3% more capacitance than Example 3. Table 3 shows the standard deviations (a) associated with these capacitance measurements. The 30 associated with Examples 3 and 4 are 2.22 nF and 1.65 nF, respectively, and since the increased capacitance of 4.33 nF is higher than the combination of these (3.87 nF) the results are significant. The minimum voltage breakdown for Examples 4, 5, 6, and 7 are higher, in all cases, than the minimum of 1120 V recorded for Example 3. The minimum voltage breakdown is a good indicator of the design capability so the new designs disclosed in Examples 4, 5, 6, 7 and 8 offers an increased capacitance over Example 3 with similar voltage capability. The present invention provides capacitors with a break down voltage of over 1120 volts.

It should also be noted that although Examples 1 and 2 have the highest capacitance their voltage breakdowns are lower than all the other examples. Furthermore, it can be seen that the highest minimum breakdown voltage was 1350 V for Example 7, the highest capacitance obtained for the inventive design that is 34.6% higher capacitance than Example 3. The semi-circle electrode pattern described in Example 8 has a similar capacitance to Example 7 but the Average, Maximum and Minimum UVBD are all slightly less for Example 8.

Inventive Examples 9-12

Four batches of MLCC were manufactured with the electrode pattern of FIG. 15 used for each layer. In FIG. 15, the top and bottom shield layers were ultimately formed by cutting the pattern shown in cut box 1501. A first polarity active terminal, and related tab, were ultimately formed by cutting the pattern shown in cut box 1502 and a second polarity active terminal, and related tab, were ultimately formed by cutting the pattern shown in cut box 1503. The fired thickness of each layer was 25.4 μm (0.001 inch). Each MLCC was formed using 44 layers. The electrical properties of each batch are provided in Table 4.

TABLE 4

| | Capacitance and Dissipation Factor - 50 pcs | | | | | Voltage Breakdown In Air - 50 pc | | | |
|---|---|---|---|---|---|---|---|---|---|
| Example | 48 hr Cap Mean (nF) | Cap Std Dev (nF) | Cap % Std Dev | 48 hr Df Mean (%) | Df Std Dev (%) | Avg. | Max. | Min. | Std. Dev. |
| 9 | 95.57 | 1.58 | 1.65% | 1.24 | 0.013 | 1781 | 2140 | 1330 | 256 |
| 10 | 95.71 | 1.04 | 1.09% | 1.24 | 0.012 | 1846 | 2170 | 1420 | 202 |
| 11 | 94.13 | 0.99 | 1.06% | 1.10 | 0.013 | 1810 | 1930 | 1590 | 100 |
| 12 | 94.85 | 0.87 | 0.92% | 1.10 | 0.014 | 1837 | 2050 | 1690 | 103 |

As can be realized from the data presented in Table 4, a single electrode pattern provides a high capacitance with a high breakdown voltage which is otherwise unavailable. The capacitance values exceed those presented in Example 3 of U.S. Pat. No. 7,336,475 even allowing for the additional capacitance attributable to and additional 2 electrode prints which are used as shields. A single pattern would not be useable in the teachings of U.S. Pat. No. 7,336,475 due to the formation of gaps in the top and bottom shields.

High voltage capacitor designs are demonstrated herein that provide higher capacitance and increased voltage handling capability than currently available in the prior art.

The invention has been described with particular reference to preferred embodiments without limitation thereto. One of skill in the art will realize additional alterations, embodiments and examples which are not specifically set forth but which are within the meets and bounds of the invention as more specifically set forth in the claims appended hereto.

The invention claimed is:

1. A method of forming a multilayered ceramic capacitor comprising:
    printing a pattern of print regions of conductive material on a series of sheets wherein each print region of said print regions comprises a bulk region and a secondary region wherein said secondary region has a region width which is less than a bulk width of said bulk region;
    forming a layered assembly by the following steps:
    overlaying a first sheet over a bottom sheet in parallel offset fashion wherein at least one said print region of said bottom sheet is overlapped but laterally offset from a print region of said first sheet with a dielectric precursor between said overlapped but laterally offset print regions;
    overlaying a second sheet over said first sheet wherein at least one said print region of said second sheet is overlapped but offset from said print region of said first sheet and said print region of said bottom sheet with a dielectric between said overlapped but laterally offset print regions;

overlaying additional sheets with alternating sheets having said print region aligned with said first sheet and said second sheet respectively with a dielectric between said overlapped but laterally offset print regions and overlaying a top sheet with said print region aligned with said bottom sheet with a dielectric between said overlapped but laterally offset print regions thereby forming un-fired, compacted sheets in a layered assembly;

dicing said un-fired, compacted sheets to isolate a layered structure with print regions of said first layer forming first internal conductors; print regions of said second layer forming second internal conductors and print regions of said top sheet and said bottom sheet forming shield layers;

firing said layered assembly to remove organic materials and fuse said sheets to form a fired monolith;

forming a first external termination in electrical contact with said first internal conductors on said fired monolith; and forming a second external termination in electrical contact with said second internal conductors on said fired monolith.

2. The method of forming a multilayered ceramic capacitor of claim 1 wherein said secondary region comprises at least one shape selected, from the group consisting of semi-round, trapezoidal, rectangular, partially rounded rectangular, and concave trapezoid.

3. The method of forming a multilayered ceramic capacitor of claim 2 wherein said secondary region comprises at least one shape selected from the group consisting of semi-circle, semi-oval and semi-obround.

4. The method of forming a multilayered ceramic capacitor of claim 2 wherein said rectangular has a length which is perpendicular to, and shorter than, a width of said bulk zone.

5. The method of forming a multilayered ceramic capacitor of claim 1 wherein said bulk zone has a height, which is at least 66% of the length of said first internal conductor as measured from said first external termination.

6. The method of forming a multilayered ceramic of claim 1 with voltage breakdown of greater than 1120 V.

7. The method of forming a multilayered ceramic capacitor of claim 6 with voltage breakdown of greater than 1500 V.

8. The method of forming a multilayered ceramic capacitor of claim 1 wherein each said print region further comprises a tertiary region opposite said secondary region.

9. The method of forming a multilayered ceramic capacitor of claim 8 wherein each said print region is symmetrical.

10. The method of forming a multilayered ceramic capacitor of claim 8 wherein said tertiary region comprises at least one shape selected from the group consisting of semi-round, trapezoidal, rectangular, partially rounded rectangular, and concave trapezoid.

11. The method of forming a multilayered ceramic capacitor of claim 10 wherein said tertiary region comprises at least one shape selected from the group consisting of semi-circle, semi-oval and semi-obround.

12. The method of forming a multilayered ceramic capacitor of claim 10 wherein said rectangular has a length which is perpendicular to, and shorter than, a width of said bulk zone.

* * * * *